United States Patent
Hladun et al.

(10) Patent No.: US 8,317,652 B2
(45) Date of Patent: Nov. 27, 2012

(54) DRIVE UNIT WITH AN INTERNAL COMBUSTION ENGINE

(75) Inventors: Marc Hladun, Braunschweig (DE); Marcel Zirwes, Braunschweig (DE); Kai Bohnstedt, Braunschweig (DE); Ekkehard Pott, Gifhorn (DE); Georg Kruse, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 1375 days.

(21) Appl. No.: 11/962,153

(22) Filed: Dec. 21, 2007

(65) Prior Publication Data

US 2008/0149405 A1 Jun. 26, 2008

(30) Foreign Application Priority Data

Dec. 22, 2006 (DE) .................. 10 2006 060 889

(51) Int. Cl.
*B60W 10/06* (2006.01)
*B60W 10/30* (2006.01)
*B60K 25/00* (2006.01)

(52) U.S. Cl. ................. 477/5; 180/53.8; 477/3

(58) Field of Classification Search .............. 180/65.1, 180/65.21; 701/22; 477/3, 5, 7
See application file for complete search history.

(56) References Cited

U.S. PATENT DOCUMENTS

| | | | | |
|---|---|---|---|---|
| 1,962,706 A | * | 6/1934 | Klemm et al. | 290/38 R |
| 1,968,951 A | * | 8/1934 | McGrath | 290/38 R |
| 3,194,087 A | * | 7/1965 | Kronogard | 74/661 |
| 4,252,208 A | * | 2/1981 | Heidemeyer et al. | 180/165 |
| 6,018,198 A | * | 1/2000 | Tsuzuki et al. | 290/17 |
| 6,048,288 A | | 4/2000 | Tsujii et al. | |
| 6,695,082 B2 | * | 2/2004 | Bitsche et al. | 180/65.25 |
| 6,832,970 B2 | | 12/2004 | Eibler | |
| 6,878,092 B1 | | 4/2005 | Schustek et al. | |
| 6,964,631 B2 | * | 11/2005 | Moses et al. | 477/3 |
| 2002/0177504 A1 | * | 11/2002 | Pels et al. | 477/3 |
| 2008/0000746 A1 | * | 1/2008 | Schiele et al. | 192/3.54 |
| 2008/0115986 A1 | * | 5/2008 | Rimaux et al. | 180/65.2 |

FOREIGN PATENT DOCUMENTS

| | | |
|---|---|---|
| DE | 19513710 A1 | 10/1995 |
| DE | 10001436 A1 | 8/2000 |
| DE | 102004018390 A1 | 12/2005 |
| DE | 102005024359 A1 | 11/2006 |
| EP | 0916546 A2 | 5/1999 |
| EP | 1282772 B1 | 4/2006 |

\* cited by examiner

*Primary Examiner* — J. Allen Shriver, II
*Assistant Examiner* — Bridget Avery
(74) *Attorney, Agent, or Firm* — Manfred Beck, P.A.

(57) ABSTRACT

An internal combustion engine drives, via a belt drive, a first and a second auxiliary unit embodied respectively as a water pump and an air-conditioning compressor and drives a starter-generator operating as a starter and as a generator depending on the operating mode. The belt drive is connected through a clutch element, which has a freewheel, to the internal combustion engine such that, when the internal combustion engine is at standstill, only the two auxiliary units, but not at the same time the internal combustion engine, are driven by the starter-generator. The clutch element which has a freewheel allows a stepless transition of the drive mode from the internal combustion engine to the starter-generator. In order to start the internal combustion engine, the clutch element is engaged only for a short time, so that the drive power of the starter-generator is transmitted to the internal combustion engine.

10 Claims, 3 Drawing Sheets

DRIVE UNIT WITH AN INTERNAL COMBUSTION ENGINE

CROSS-REFERENCE TO RELATED APPLICATION

This application claims the priority, under 35 U.S.C. §119, of German Patent Application No. DE 10 2006 060 889.5, filed Dec. 22, 2006; the prior application is herewith incorporated by reference in its entirety.

BACKGROUND OF THE INVENTION

Field of the Invention

The invention relates to a drive unit, in particular for motor vehicles, including an internal combustion engine, at least one auxiliary unit, which can be driven through the use of a clutch element on demand in operation of the internal combustion engine and when the internal combustion engine is switched off, and including a starter for the internal combustion engine.

A drive unit of this type is for example the subject matter of German Patent Application Publication No. DE 195 13 710 A1 which relates to a configuration for operating an air-conditioning system in a motor vehicle, in which configuration the compressor of the air-conditioning system can be driven by an internal combustion engine which can be connected through the use of a clutch to a transmission, and can be switched on or switched off by a switch actuation. Here, it is provided that two further clutches are provided on that side of the internal combustion engine which faces away from the transmission. The compressor of the air-conditioning system is provided between the two further clutches. Whenever the internal combustion engine is decoupled from the drivetrain and is shut down, the clutch between the internal combustion engine and the air-conditioning compressor is opened and the clutch between the compressor and the electric motor is closed. By the subsequent activation of the electric motor, the air-conditioning system can thus remain in operation, despite the internal combustion engine being at standstill, without any loss of comfort for the driver of the motor vehicle.

European Patent Application Publication No. EP 09 16 546 A2 discloses a drive system for auxiliary units of an internal combustion engine which are connected through the use of pulley disks and belts. Additionally provided is a clutch for enabling and blocking the transmission of force between the motor-generator and the internal combustion engine. Once the internal combustion engine is switched off, the clutch is interrupted and the auxiliary machines are driven by the motor-generator. One embodiment discloses a step-down mechanism which is embodied as a planetary gear set and which serves to reduce the rotational speed between the generator and the internal combustion engine or the internal combustion engine and the compressor.

A disadvantage of this prior art has proven to be that the clutch must remain engaged during the operation of the internal combustion engine, and therefore demands a considerable amount of production expenditure in order to avoid occurrences of wear and a resulting susceptibility to failure. In addition, the clutch element demands a high level of control expenditure in order to ensure a constant drive of the auxiliary unit independently of the drive mode.

Additionally known, from German Patent Application Publication No. DE 10 2004 018 390 A1, is a device for transmitting a torque from the crankshaft of an internal combustion engine to a drive input shaft of an auxiliary unit. A pulley disk of a belt drive, the pulley disk being rotatably mounted on a housing of the auxiliary unit, is connected to the drive input shaft of the auxiliary unit. The device has, in the force flow from the pulley disk to the drive input shaft of the auxiliary unit, a device which limits the transmissible torque, with a freewheel clutch which keeps excessive vibration loadings, which are caused by the auxiliary unit, away from the belt drive.

SUMMARY OF THE INVENTION

It is accordingly an object of the invention to provide a drive unit, in particular a drive unit for a motor vehicle, which overcomes the above-mentioned disadvantages of the heretofore-known drive units of this general type and which ensures an advantageous control expenditure and also construction expenditure with regard to the uninterrupted drive of the auxiliary unit both when the internal combustion engine is running and also when the internal combustion engine is switched off.

With the foregoing and other objects in view there is provided, in accordance with the invention, a drive unit, including:

an internal combustion engine;
a starter for the internal combustion engine;
an auxiliary unit operatively connected to the internal combustion engine; and
a clutch element provided with a freewheel, the auxiliary unit being configured to be driven via the clutch element on demand during operation of the internal combustion engine and when the internal combustion engine is switched off.

In other words, in accordance with the invention, there is provided a drive unit, in particular for motor vehicles, having an internal combustion engine and at least one auxiliary unit which can be driven through the use of a clutch element on demand in operation of the internal combustion engine and when the internal combustion engine is switched off, and also a starter for the internal combustion engine, wherein the clutch element is provided with a freewheel.

According to another feature of the invention, the clutch element is configured to connect the internal combustion engine to the auxiliary unit via a belt drive.

According to another feature of the invention, the clutch element is configured to be engageable by an interruption of the freewheel only for a transmission of a drive power of the starter to the internal combustion engine.

According to another feature of the invention, the clutch element is embodied as a lockable freewheel.

According to another feature of the invention, the starter is at the same time configured as a generator.

According to another feature of the invention, an electric motor is connected, via the clutch element, to the auxiliary unit.

According to another feature of the invention, the clutch element and the electric motor are embodied as a modular unit.

According to another feature of the invention, the freewheel connects the internal combustion engine and the auxiliary unit to one another such that the auxiliary unit can be driven by the internal combustion engine when the internal combustion engine is in operation and can be driven by the starter and/or the electric motor when the internal combustion engine is at standstill.

According to another feature of the invention, the auxiliary unit has an air-conditioning compressor.

With the foregoing and other objects in view there is provided, in accordance with the invention, a motor vehicle having a drive unit with an internal combustion engine; a starter for the internal combustion engine; an auxiliary unit operatively connected to the internal combustion engine; and a clutch element provided with a freewheel, the auxiliary unit being configured to be driven via the clutch element on demand during operation of the internal combustion engine and when the internal combustion engine is switched off.

The invention is based on the consideration that the change of the drive of the auxiliary unit by the internal combustion engine on the one hand and when the internal combustion engine is at standstill on the other hand demands no engagement/disengagement process of the clutch element if, through the use of the freewheel, an undesired transmission of the drive power, which is intended for the auxiliary unit and is imparted for example through the use of the starter, to the internal combustion engine is automatically prevented without additional control. At the same time, the drive of the auxiliary unit when the internal combustion engine is running also does not demand any engaged position of the clutch element, because through the use of the freewheel, which is also referred to as an overrunning clutch, the drive power of the internal combustion engine is transmitted without further mechanical elements to the auxiliary unit. Only for starting the internal combustion engine is the clutch element briefly closed so that the internal combustion engine can be driven by the starter. In this way, the control and also the structural demands on the clutch element are considerably simplified.

The clutch element could be configured for a direct connection of the internal combustion engine to the auxiliary unit. Particularly practical, however, is an embodiment of the invention in which the clutch element is configured to connect the internal combustion engine to the auxiliary unit through the use of a belt drive. In this way, a plurality of auxiliary units can be moved simultaneously via the common belt drive through the use of the clutch element, in accordance with a demand, by the internal combustion engine or through the use of a separate drive, as a result of which it is possible in particular to obtain a flexible configuration of different elements without any change to the clutch element.

Here, it has been proven to be particularly promising for practical use if the clutch element is engageable/disenageable only for the transmission of the drive power of the starter to the internal combustion engine through an interruption of the freewheel, so that the drive power required for starting the internal combustion engine takes place not independently of the freewheel, but rather by a brief locking of the freewheel which leads to a direct force transmission. Here, the clutch element serves to set the locking position of the freewheel.

Also particularly simple here is an embodiment of the present invention in which the clutch element is embodied as a lockable freewheel, so that the construction expenditure for the clutch element is reduced to a minimum. A clutch function which goes beyond the blocking function can be dispensed with here, as a result of which the control expenditure can at the same time also be further reduced.

A particularly compact construction can be advantageously realized when the starter is at the same time embodied as a generator. The starter, which is also referred to as a starter-generator, drives the at least one auxiliary unit through the use of the belt drive when the internal combustion engine is at standstill, with a co-rotation of the crankshaft of the internal combustion engine being prevented on account of the simultaneously open freewheel. To start the internal combustion engine, the clutch is briefly closed, and the drive power of the starter is transmitted to the internal combustion engine.

In another likewise particularly expedient embodiment of the present invention, the drive unit has an electric motor which is connected through the use of the clutch element to the auxiliary unit. Here, the internal combustion engine is started through the use of the starter, in particular a pre-engaged starter. In operation of the internal combustion engine, the auxiliary unit and if appropriate also a separate generator are driven in the conventional way by the crankshaft via the belt drive through the use of the freewheel. When the internal combustion engine is at standstill, the additional electric motor drives the belt drive and therefore the auxiliary unit, with the freewheel being open.

A further, likewise particularly compact variant of the drive unit according to the invention is obtained when the clutch element and the electric motor are embodied as a modular unit or structural unit. The electric motor for driving the auxiliary unit when the internal combustion engine is at standstill is integrated here in a space-saving manner into a modular unit which at the same time includes the clutch element.

Here, an embodiment has been proven to be particularly promising in which the freewheel connects the internal combustion engine and the auxiliary unit to one another in such a way that the auxiliary unit can be driven by the internal combustion engine when the latter is in operation and can be driven by the starter and/or the electric motor when the internal combustion engine is at standstill. The auxiliary unit can therefore be driven without an interruption to the drive power, which is required for driving it, by the internal combustion engine on the one hand and by the starter and/or the electric motor on the other hand. An interruption in the drive power which acts on the auxiliary unit when switching off the internal combustion engine is prevented here, without additional control being required for this purpose.

The auxiliary unit which can be driven through the use of the clutch element can fundamentally serve different purposes. It is however particularly practical if the auxiliary unit has an air-conditioning compressor. In addition, it can also be possible for a water pump to be driven through the use of the belt drive in order to be able to ensure a comfortable climate control of the motor vehicle, in particular also of a hybrid vehicle, when the internal combustion engine is at standstill.

Other features which are considered as characteristic for the invention are set forth in the appended claims.

Although the invention is illustrated and described herein as embodied in a drive unit for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
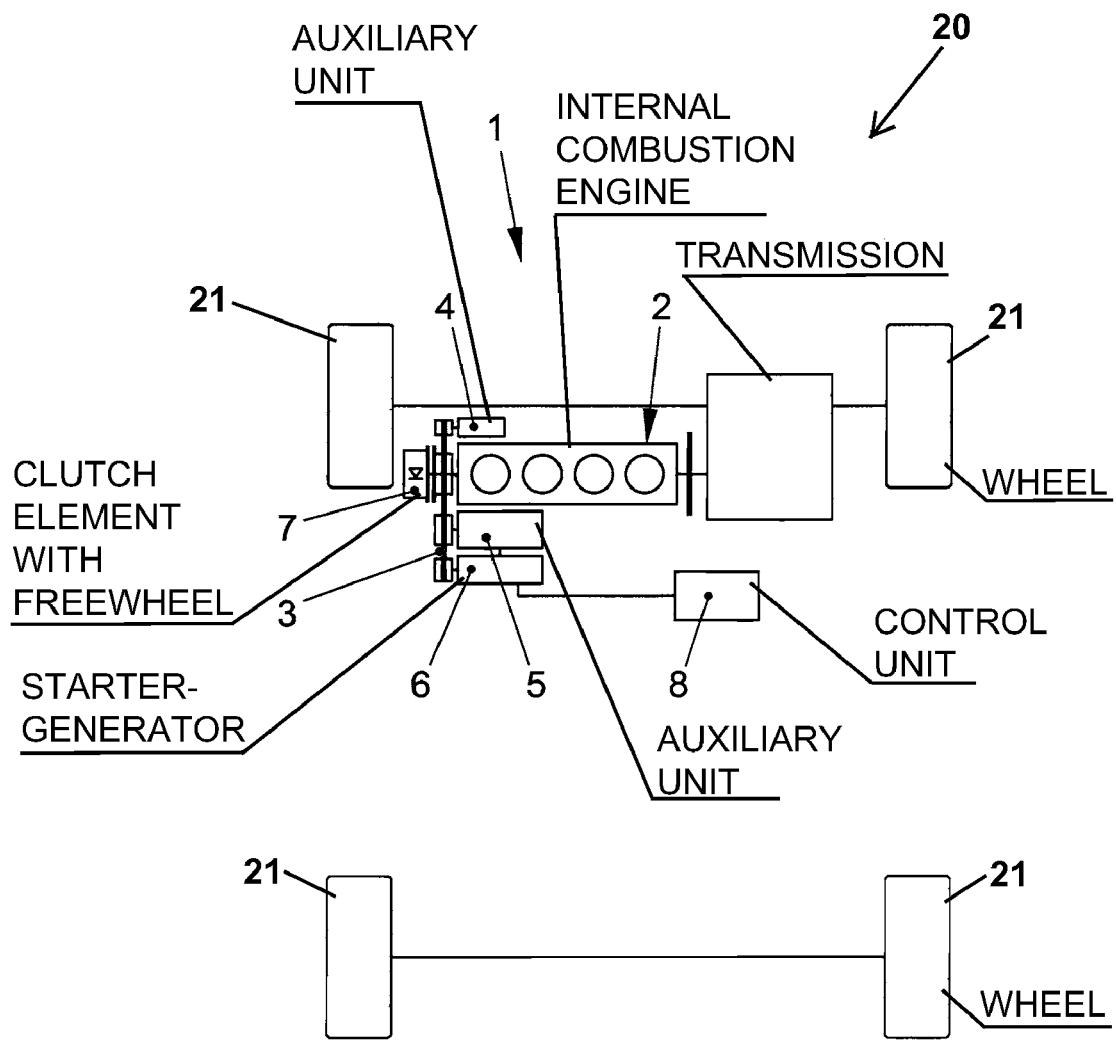
FIG. 1 is a schematic diagram of a drive unit having a clutch element which has a freewheel and having a starter-generator in accordance with the invention.

Referring now to the figures of the drawings in detail and first, particularly, to FIG. 1 thereof, there is shown in a diagrammatic illustration, a drive unit 1 which is designed for a motor vehicle 20. The motor vehicle 20 is only schematically indicated by its drive unit 1 and four wheels 21. The drive unit 1 is provided with an internal combustion engine 2, through the use of which, in operation, a first auxiliary unit 4 which is embodied as a water pump, a second auxiliary unit 5 which is embodied as an air-conditioning compressor, and a starter-generator 6 which can be used as a starter and as a generator depending on the operating mode, are driven through the use of a belt drive 3. In order to be able to operate at least the second auxiliary unit 5 which is embodied as an air-conditioning compressor even when the internal combustion engine 2 is at standstill, the belt drive 3 is connected through the use of a clutch element 7, which has a freewheel mechanism, to the internal combustion engine 2 in such a way that, when the internal combustion engine 2 is at standstill, only the two auxiliary units 4, 5, but not at the same time the internal combustion engine 2, are driven by the starter-generator 6. Here, through the use of the clutch element 7 which has a freewheel, a stepless transition of the drive mode from the internal combustion engine 2 to the starter-generator 6 can take place. In order to start the internal combustion engine 2, the clutch element 7 is closed only for a short time, in order to thus transmit the drive power of the starter-generator 6 to the internal combustion engine 2. The corresponding operating mode of the starter-generator 6 is monitored here through the use of a control unit 8.

Figure 2:
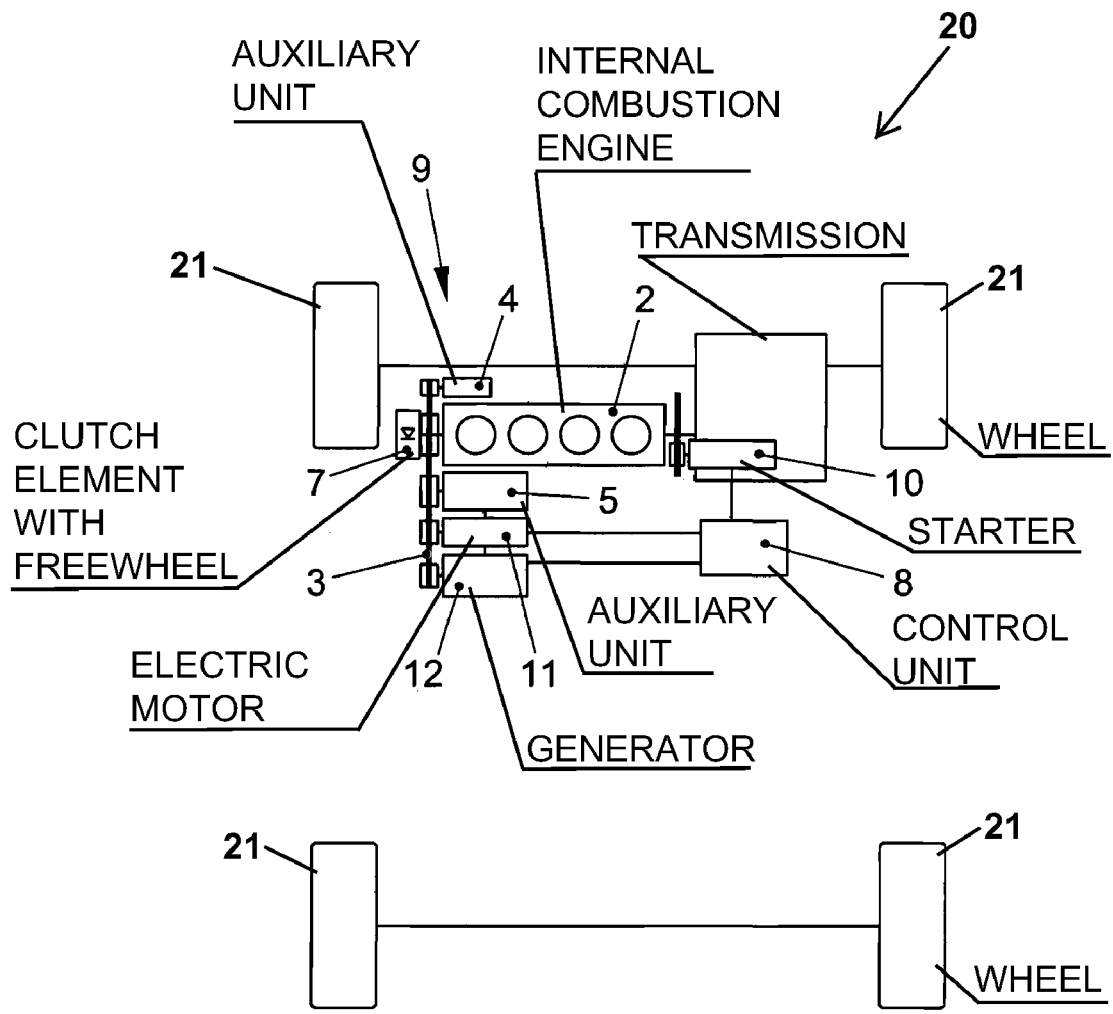
FIG. 2 is a schematic diagram of a further drive unit having a separate electric motor in accordance with the invention.

In contrast, FIG. 2 illustrates a variant of the drive unit 9 in which a starter 10 can be used only for starting the internal combustion engine 2 and a separate electric motor 11 serves for driving the auxiliary units 4, 5 through the use of the belt drive 3. Here, the clutch element 7, which is advantageously configured as a freewheel, prevents the drive power of the electric motor 11 from being transmitted in an undesirable way to the internal combustion engine 2. With respect to the control technology, the synchronization of the electric motor 11, of the starter 10 and of a generator 12 is performed through the use of the control unit 8.

Figure 3:
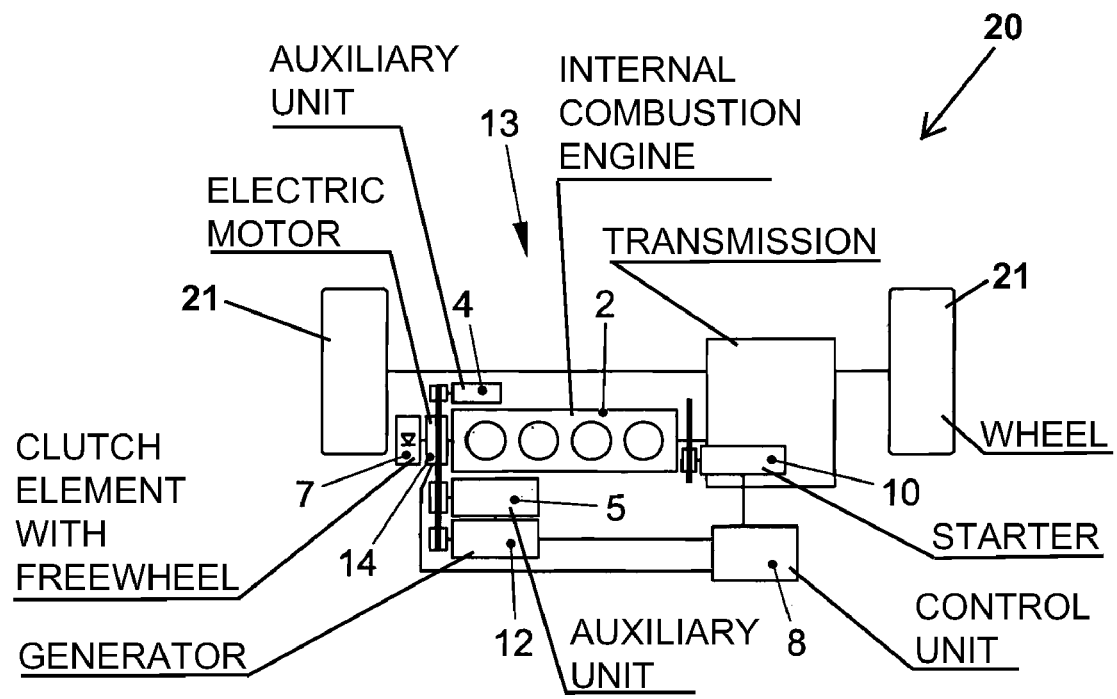
FIG. 3 is a schematic diagram a further drive unit having a clutch element and an electric motor which are combined to form a modular unit in accordance with the invention.
Figure 3:
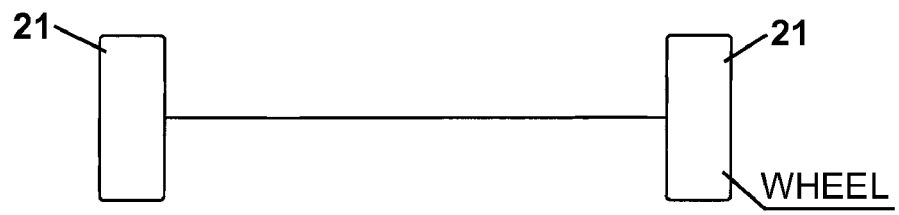

In a third variant of the drive unit 13 which is shown in FIG. 3, the clutch element 7 and an electric motor 14 which serves to drive the auxiliary units 4, 5 are combined to form a modular unit, and therefore require only an extremely small installation space. In this way, this variant is also optimally suitable for retrofitting to existing drive units 13. In the illustrated variant, the starter 10 and the separate generator 12 are connected to the internal combustion engine 2, which starter 10 and the separate generator 12 are likewise connected to the control unit 8, like the electric motor 14.

What is claimed is:

1. A drive unit, comprising:
an internal combustion engine;
a starter for said internal combustion engine;
an auxiliary unit operatively connected to said internal combustion engine; and
a clutch element provided with a freewheel, said auxiliary unit being configured to be driven via said clutch element on demand during operation of said internal combustion engine and when said internal combustion engine is switched off, wherein said clutch element is configured to be engageable by an interruption of said freewheel only for a transmission of a drive power of said starter to said internal combustion engine.

2. The drive unit according to claim 1, including a belt drive, said clutch element being configured to connect said internal combustion engine to said auxiliary unit via said belt drive.

3. The drive unit according to claim 1, wherein said clutch element is embodied as a lockable freewheel.

4. The drive unit according to claim 1, wherein said starter is at the same time configured as a generator.

5. The drive unit according to claim 1, including an electric motor connected, via said clutch element, to said auxiliary unit.

6. The drive unit according to claim 5, wherein said clutch element and said electric motor are embodied as a modular unit.

7. The drive unit according to claim 1, wherein said freewheel connects said internal combustion engine and said auxiliary unit to one another such that said auxiliary unit can be driven by said internal combustion engine when said internal combustion engine is in operation and can be driven by said starter when said internal combustion engine is at standstill.

8. The drive unit according to claim 5, wherein said freewheel connects said internal combustion engine and said auxiliary unit to one another such that said auxiliary unit can be driven by said internal combustion engine when said internal combustion engine is in operation and can be driven by at least one of said starter and said electric motor when said internal combustion engine is at standstill.

9. The drive unit according to claim 1, wherein said auxiliary unit has an air-conditioning compressor.

10. In a motor vehicle, a drive unit comprising:
an internal combustion engine;
a starter for said internal combustion engine;
an auxiliary unit operatively connected to said internal combustion engine; and
a clutch element provided with a freewheel, said auxiliary unit being configured to be driven via said clutch element on demand during operation of said internal combustion engine and when said internal combustion engine is switched off, wherein said clutch element is configured to be engageable by an interruption of said freewheel only for a transmission of a drive power of said starter to said internal combustion engine.

* * * * *